(12) United States Patent
Gao et al.

(10) Patent No.: US 9,724,711 B2
(45) Date of Patent: Aug. 8, 2017

(54) POWDER DELIVERY DEVICE

(75) Inventors: Minjian Gao, Hong Kong (HK); Ruqun Ke, Hong Kong (HK)

(73) Assignee: YU TUNG INVESTMENT HOLDINGS LIMITED, Hong Kong (HK)

( * ) Notice: Subject to any disclaimer, the term of this patent is extended or adjusted under 35 U.S.C. 154(b) by 0 days.

(21) Appl. No.: 14/418,938

(22) PCT Filed: Aug. 31, 2012

(86) PCT No.: PCT/CN2012/080861
§ 371 (c)(1),
(2), (4) Date: Jun. 9, 2015

(87) PCT Pub. No.: WO2014/019270
PCT Pub. Date: Feb. 6, 2014

(65) Prior Publication Data
US 2015/0343465 A1 Dec. 3, 2015

(30) Foreign Application Priority Data

Jul. 31, 2012 (CN) .......................... 2012 1 0271564

(51) Int. Cl.
*B65G 53/40* (2006.01)
*B05B 7/14* (2006.01)
(Continued)

(52) U.S. Cl.
CPC ............ *B05B 7/1459* (2013.01); *B65G 53/16* (2013.01); *B65G 53/40* (2013.01); *F04B 15/00* (2013.01); *F04B 19/22* (2013.01)

(58) Field of Classification Search
CPC ......... B65G 53/16; B65G 53/40; B65G 53/50
(Continued)

(56) References Cited

U.S. PATENT DOCUMENTS 2,667,280 A * 1/1954 Lane ..................... B01J 8/003
406/109
2,734,782 A * 2/1956 Galle .................... B65G 53/22
266/182
(Continued)

*Primary Examiner* — William R Harp
(74) *Attorney, Agent, or Firm* — Miskin & Tsui-Yip LLP; Gloria Tsui-Yip, Esq.

(57) ABSTRACT

The invention provides a powder conveying device including: a pump body (1), a powder sucking plunger (4), a powder suction conduit (2), a powder discharge conduit (3), a powder suction valve (5), and a powder discharge valve (6), wherein the pump body (1) comprising a transfer chamber (13) that is configured with a powder inlet (11) connected to the powder suction conduit (2) and a powder outlet (12) connected the powder discharge conduit (3); and a powder sucking plunger (4) configured in the upper part of the transfer chamber (13) and movable up and down inside the transfer chamber (13). When the powder sucking plunger (4) moves upward, the powder suction conduit (2) is opened by the powder suction valve (5) and the powder discharge conduit (3) is closed by the powder discharge valve (6) so that the powder is sucked into the transfer chamber (13) through the powder suction conduit (2). When the powder sucking plunger (4) moves downward, the powder suction conduit (2) is closed by the powder suction valve (5) and the powder discharge conduit (3) is opened by the powder discharge valve (6) so that the powder is discharged from the transfer chamber (13) through the powder discharge conduit (3). The powder inlet (11) is configured in the inner sidewall (130) of the transfer chamber (13), and the powder inlet (11) is above the powder outlet (12). Therefore the powder outflow is much smoother. Further, the quantity and stability of the powder feeding is improved.

8 Claims, 6 Drawing Sheets

(51) Int. Cl.
   *F04B 15/00* (2006.01)
   *F04B 19/22* (2006.01)
   *B65G 53/16* (2006.01)

(58) Field of Classification Search
   USPC .................................. 406/73, 74, 85, 96, 108
   See application file for complete search history.

(56) References Cited

U.S. PATENT DOCUMENTS

| | | | | |
|---|---|---|---|---|
| 2,897,009 | A * | 7/1959 | Gianniny, Jr. | B65G 53/22 406/138 |
| 4,521,165 | A * | 6/1985 | Handleman | B65G 53/08 406/50 |
| 4,834,589 | A * | 5/1989 | Dietrich | B65G 53/28 406/109 |
| 6,447,216 | B1 * | 9/2002 | Higuchi | F04B 15/02 222/334 |
| 7,163,359 | B2 * | 1/2007 | Moser | B05B 7/1459 406/151 |
| 7,287,964 | B2 * | 10/2007 | Sanwald | B05B 7/1459 417/395 |
| 2005/0002742 | A1 * | 1/2005 | Bachmann | B65G 53/28 406/10 |
| 2011/0044772 | A1 * | 2/2011 | Ko | B05B 7/1459 406/12 |

* cited by examiner

POWDER DELIVERY DEVICE

FIELD OF THE INVENTION

This invention generally relates to a powder conveying device mainly used for conveying solid powder.

BACKGROUND OF THE INVENTION

At present, the known powder conveying devices are operated based on Venturi Principle, which carry powder by airflow. The known powder conveying devices are simple in structure, but have some deficiency. Firstly, the concentration of the powder delivered in the air flow is very low. Since the powder is conveyed in the airflow, the speed of carrying airflow has to be faster than the minimum suspension speed of the powder. Secondly, the amount of the conveyed powder will fluctuate over time. Furthermore, it is difficult to adjust the amount of powder delivery accurately. This deficiency is more pronounced when using a Venturi powder pump to convey powder coating after a period of time, both the film evenness of the coating and the visual quality of the surface finish will be affected.

Therefore, many alternative means of conveying powder other than using the Venturi Principle have been proposed in recent time. In recent years high dense phase conveying technology has been developed.

European Patent Application EP 1 106 547 A1 disclosed a device wherein powder is pneumatically transferred to a metering chamber that is connected to a powder suction conduit. The metering chamber further connects to a pressure conduit. The powder is conveyed from the metering chamber to a powder discharge conduit via the pressure conduit.

To make negative pressure in the powder suction conduit, the device requires negative pressure generated by external devices such as a vacuum pump outside the metering chamber. Control means has to be placed between the pump and the metering chamber. The control means is used to turn off or turn on the air conduit. The powder suction conduit and the metering chamber are separated by breathable membrane so that the powder flowed into the metering chamber cannot access the powder suction conduit. The deficiency of this proposal is that the breathable membrane will be clogged or blocked due to the composition and property of the powder, causing negative effect to the device's smooth operation.

European Patent Application EP0124933 disclosed another membrane pump for conveying powder, and described a pump having a powder sucking plunger that is movable up and down in a transfer chamber. When moving upwards, the powder sucking plunger generates negative pressure in the feed conduit and sucks the powder out of the storage container. The powder is then compressed in the transfer chamber with the help of downward movement of the powder sucking plunger. When the powder sucking plunger reaches the low stop point, the powder discharge conduit is open and the compressed powder is conveyed to an applying device. To generate negative pressure, the powder sucking plunger has to be sealed by a seal ring, causing moving parts vulnerable to wear and contamination. This kind of pump generates an uneven powder/volume flow. Furthermore, since the powder is firstly compressed prior to the conveying, the powder is probably compacted. For example, low temperature curing coating powder can easily block the transfer chamber.

That is why this kind of pump is never used for conveying coating powder.

According to U.S. Pat. No. 3,391,963, movement back and forth of the powder sucking plunger can prevent the membrane in a conveying device from being blocked. The powder in the membrane is shaken off because of the membrane's fluctuation. This device operates when compressed air is not fed to the transfer chamber. Since semipermeable membrane is required, the cost of the device is high, and the semipermeable membrane is vulnerable to wear. Furthermore, most of the powder is conveyed by the membrane's mechanical movement. Therefore, a part of powder still retains on the surface of the membrane and probably causes blockage over time.

Accordingly, a Chinese patent application, Publication No. CN 101992950A, entitled A Powder Conveying Method And Powder Conveying System For Smoothly Conveying Powder resolves the above mentioned problems. However, this powder conveying structure still has the following deficiency:

1) The powder inlet and powder outlet of the transfer chamber is configured at the bottom of the transfer chamber. Therefore, the subsequent inlet powder is blocked by the previous inlet powder. It is not helpful to suck more powder into the transfer chamber. That is, the powder inlet causing the problem of hindering powder inflow.

2) Powder of poor flowing property tends to retain in the bottom part of the transfer chamber. The powder is difficult to be normally conveyed and can easily block the powder channel.

3) When the powder pump conveys powder, the air flow is intermittently or continuously controlled, and affected by the intermitting operation of the powder sucking plunger. Therefore, the powder conveying is not consistent and not even.

SUMMARY OF THE INVENTION

The objective of the present invention is to provide a powder conveying device that has a smoother powder inflow. The powder conveying device has increased the quantity of inflow powder and ensured a more constant inflow of powder.

A further object of the present invention is to reduce the poor fluidization of the powder remaining in the bottom of the transfer chamber.

A further object of the present invention is to provide a stable and constant quantity of powder conveying means.

The present invention is achieved by the following technical solutions:

Accordingly, in one aspect thereof, the present invention provides a powder conveying device, comprises: a pump body; a powder sucking plunger; a powder suction conduit and a powder suction valve; a powder discharge conduit and a powder discharge valve; the pump body comprising a transfer chamber that is configured with a powder inlet connected to the powder suction conduit and a powder outlet connected to the powder discharge conduit; and a powder sucking plunger configured in the upper part of the transfer chamber and movable up and down inside the transfer chamber; when the powder sucking plunger moves upward, the powder suction conduit is opened by the powder suction valve and the powder discharge conduit is closed by the powder discharge valve so that the powder is sucked into the transfer chamber through the powder suction conduit; when the powder sucking plunger moves downward, the powder suction conduit is closed by the powder suction valve and the powder discharge conduit is opened by the powder discharge valve so that the powder is discharged from the transfer chamber through the powder discharge conduit;

wherein the powder inlet is configured in the inner sidewall of the transfer chamber, and the powder inlet is positioned above the powder outlet.

Preferably, the powder outlet is configured in the bottom wall of the transfer chamber.

Preferably, the transfer chamber is a cylindrical chamber.

Preferably, the powder inlet is tangential to the inner sidewall.

Preferably, the bottom wall of the transfer chamber is a porous fluidized plate, and the powder outlet is configured on the surface of the fluidized plate.

Preferably, the terminal end of powder discharge conduit is connected to an inlet of a powder gas mixer; one end of the powder gas mixer connects to an auxiliary air device, the other end of the powder gas mixer connects to a powder conveying conduit and outputs gas-solid two phase flow.

Preferably, the pump body is configured with a left transfer chamber and a right transfer chamber, a left powder sucking plunger and a right powder sucking plunger that are respectively positioned inside the left transfer chamber and the right transfer chamber; the left transfer chamber is configured with a left powder inlet for connecting to a left powder suction conduit and a left powder outlet for connecting a left powder discharge conduit; the right transfer chamber is configured with a right powder inlet for connecting to a right powder suction conduit and a right powder outlet for connecting a right powder discharge conduit; the left powder suction conduit is controlled by a left powder suction valve, the right powder suction conduit is controlled by a right powder suction valve, the left powder discharge conduit and the right powder discharge conduit are simultaneously controlled by one common powder discharge valve.

Preferably, the powder suction conduit comprises a first flexible conduit and two connectors that respectively connect to two ends of the first flexible conduit; the powder discharge conduit comprises a second flexible conduit and two connectors that respectively connect to two ends of the second flexible conduit.

Preferably, the powder suction valve and the powder discharge valve are pinch valves, comprising a drive cylinder and clamping assembly driven by the drive cylinder to clamp or unclamp the powder suction conduit and the powder discharge conduit.

The powder conveying device of the present invention has the following advantages:

(1) The powder inlet is configured in the inner sidewall of the transfer chamber. The powder inlet is positioned higher than the powder outlet. The powder sucked into the transfer chamber will settle downward below the powder inlet and won't block the powder inlet. This will benefit the sucking in of more powder and make the powder inflow smoother.

(2) The powder outlet is configured at the bottom wall of the transfer chamber, which is a reasonable design. The powder inlet is tangential to the sidewall of the transfer chamber. The powder sucked into the transfer chamber will settle slowly and downward along the cylindrical inner sidewall. The powder will not swirl up in a turbulent manner.

(3) The bottom wall of the transfer chamber is a porous fluidized plate. The powder on the fluidized plate are fluidized by airflow to improve the fluidity of the powder. The powder is prevented from settling down on the bottom wall and obstructing the powder outlet. Therefore, the powder conveying capacity is increased.

(4) The terminal end of the powder discharge conduit is connected to a mid-inlet of the powder gas mixer. One end of the powder gas mixer connects to an auxiliary air device, the other end of the powder gas mixer is for discharging powder. The auxiliary air device generates 1-1000 Hz pulsating airflow which will vibrate and push the powder forward, this will therefore convey the powder continuously and consistently without the problem of powder "spitting." The flowability of the powder is also improved, solving the problem of poor flowability caused by fine powder or powder which will easily conglomerate.

(5) In a preferred embodiment the pump body is configured with a left transfer chamber and a right transfer chamber. A left powder sucking plunger and a right powder sucking plunger that are respectively positioned inside the left transfer chamber and the right transfer chamber. The left transfer chamber is configured with a left powder inlet for connecting to a left powder suction conduit and a left powder outlet or connecting a left powder discharge conduit. The right transfer chamber is configured with a right powder inlet for connecting to a right powder suction conduit and a right powder outlet for connecting a right powder discharge conduit. The left powder suction conduit is controlled by a left powder suction valve. The right powder suction conduit is controlled by a right powder suction valve. The left powder discharge conduit and the right powder discharge conduit are simultaneously controlled by one common powder discharge valve. The powder discharge is much smoother. Furthermore, the left powder discharge conduit and the right powder discharge conduit are controlled by one common powder discharge valve Such that the powder discharge in the left powder discharge conduit and the right powder discharge conduit can be overlapped, resulting in smoother powder discharge. It also simplifies the structure and makes control easier.

DETAILED DESCRIPTION OF VARIOUS EMBODIMENTS

Various embodiments of the present invention are described, by way of example only, with reference to the drawings.

Figure 1:
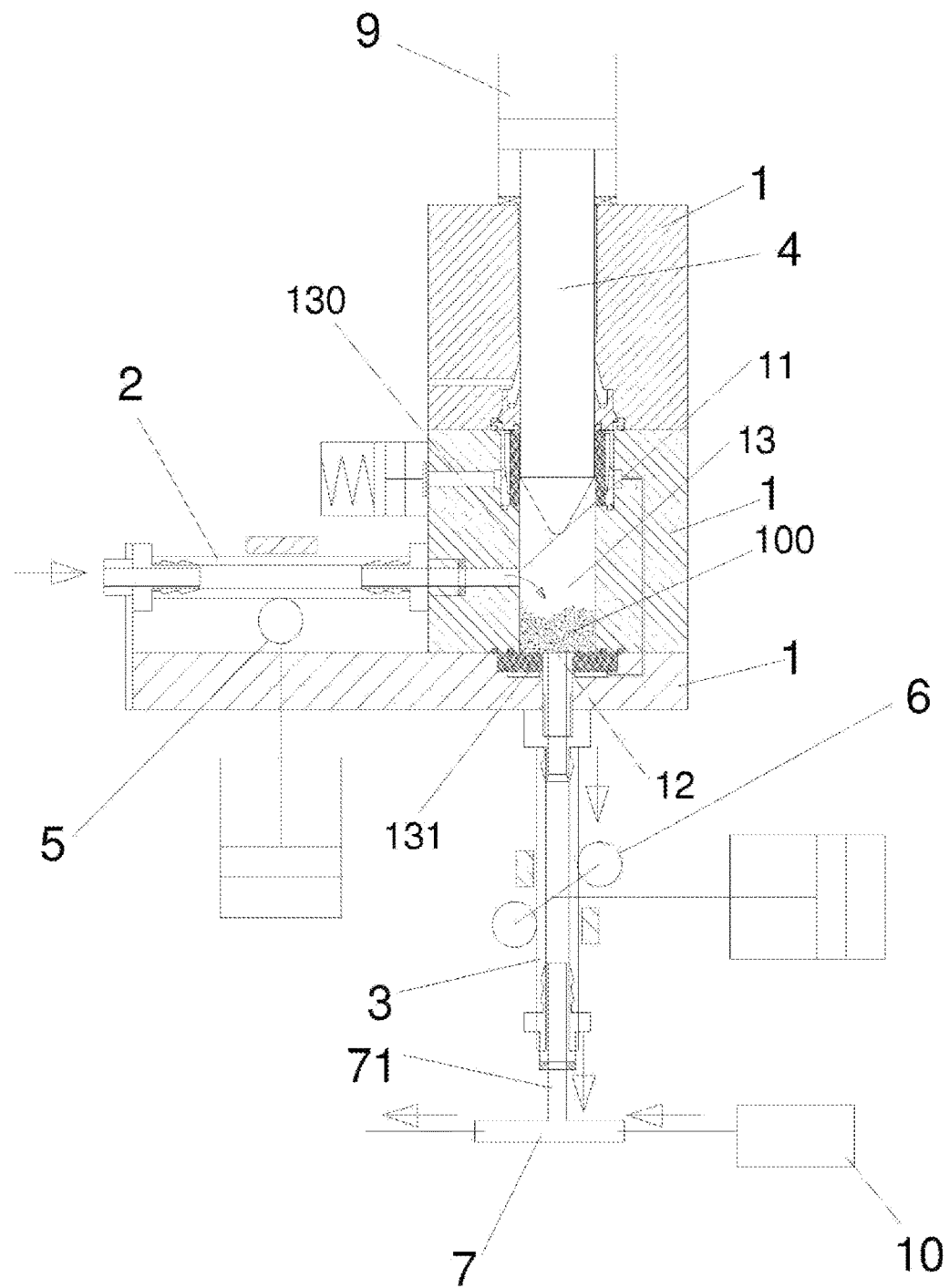
FIG. 1 is a schematic diagram of a powder conveying device according to a first embodiment of the present invention.
Figure 2:
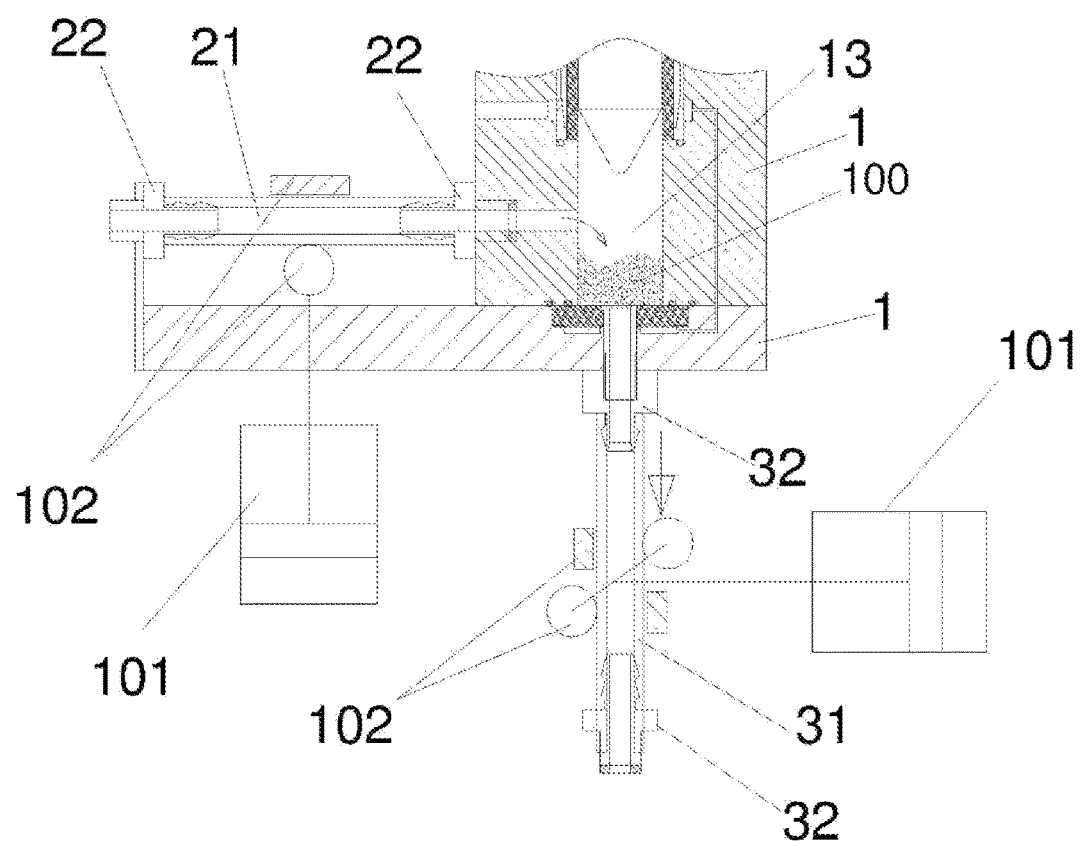
FIG. 2 schematically illustrates the powder suction conduit and powder discharge conduit of the powder conveying device shown in FIG. 1.
Figure 3:
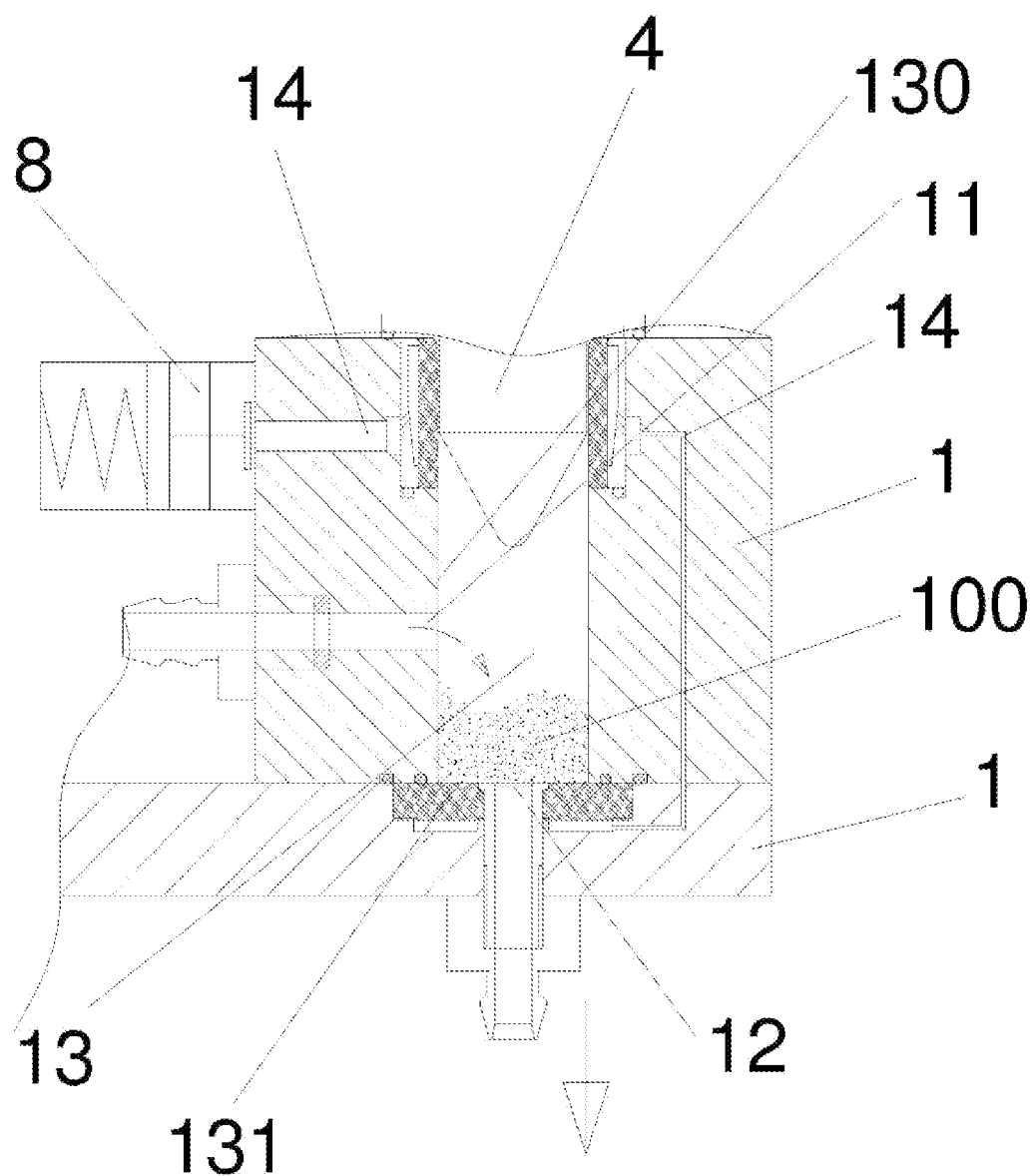
FIG. 3 schematically illustrates the fluidized plate of the powder conveying device shown in FIG. 1.

Referring to FIG. 1, FIG. 2 and FIG. 3, the powder conveying device according to the first embodiment of the present invention comprises a pump body 1, a powder sucking plunger 4, a powder suction conduit 2, a powder discharge conduit 3, a powder suction valve 5 for the powder suction conduit and a powder discharge valve 6 for the powder discharge conduit. A transfer chamber 13 is configured inside the pump body 1. The transfer chamber 13 is configured with a powder inlet 11 that connects to the powder suction conduit 2, and the transfer chamber 13 is configured with a powder outlet 12 that connects to the powder discharge conduit 3. The powder sucking plunger 4 is installed inside the transfer chamber 13 and is movable up and down along the transfer chamber 13. When the powder sucking plunger 4 moves upward, the powder suction valve 5 opens the powder suction conduit 2, and the powder discharge valve 6 closes the powder discharge conduit 3, so that the powder 100 is sucked into the transfer chamber 13 through the powder suction conduit 2. When the powder sucking plunger 4 moves downward, the powder suction valve 5 closes the powder suction conduit 2 and the powder discharge valve 6 opens the powder discharge conduit 3, so that the powder 100 is discharged from the transfer chamber 13 through the powder discharge conduit 3. The powder inlet 11 is configured in the inner sidewall 130 of the transfer chamber 13. The position of the powder inlet 11 is higher than the powder outlet 12. A drive cylinder 9 is positioned on the top of the pump body 1. The output end of the drive cylinder 9 connects to the powder sucking plunger 4 and drives the powder sucking plunger 4 to move up and down. It is contemplated that the drive device for driving the powder sucking plunger 4 is not limited to drive cylinder. For example, other linear reciprocating mechanism could be used to drive the powder sucking plunger 4. The powder outlet 12 is configured at the bottom wall 131 of the transfer chamber 13. The transfer chamber 13 is a cylindrical chamber. The other end of the powder discharge conduit 3 connects to a mid-inlet 71 of a powder gas mixer 7. The powder gas mixer 7 has one end connected to an auxiliary air device 10, and the other end for discharging powder.

As shown in FIG. 2, the powder suction conduit 2 comprises a flexible conduit 21 and two connectors 22 that are configured at two ends of the flexible conduit 21 respectively. The powder discharge conduit 3 comprises another flexible conduit 31 and two other connectors 32 that are configured at two ends of the flexible conduit 31 respectively. The powder suction valve 5 and the powder discharge valve 6 are pinch valves, comprising a drive cylinder 101 and a clamping assembly 102. Both the flexible conduit 21 and 31 are clamped by corresponding clamping assembly 102. The clamping assembly 102 is driven by the drive cylinder 101 to accomplish the function by which the clamping assembly 102 can be clamped or unclamped, as to allow the opening and closing of the flexible conduit 31 and 21.

As shown in FIG. 3, the pump body 1 is configured with a pneumatic control valve 8 and a compressed air channel 14. The inlet of the air channel 14 is closed by the pneumatic control valve 8. One outlet of the air channel 14 is located below the bottom wall 131. The bottom wall 131 is a porous fluidized plate. When the pneumatic control valve 8 is opened, the compressed air enters into the compressed air channel 14, reaches the bottom of the porous fluidized plate, penetrates though the porous fluidized plate. The powder 100 on the porous fluidized plate is driven to floated and thus fluidized by the compressed air, which enhances the flowability of the powder 100 and avoids any blockages or retention.

Figure 4:
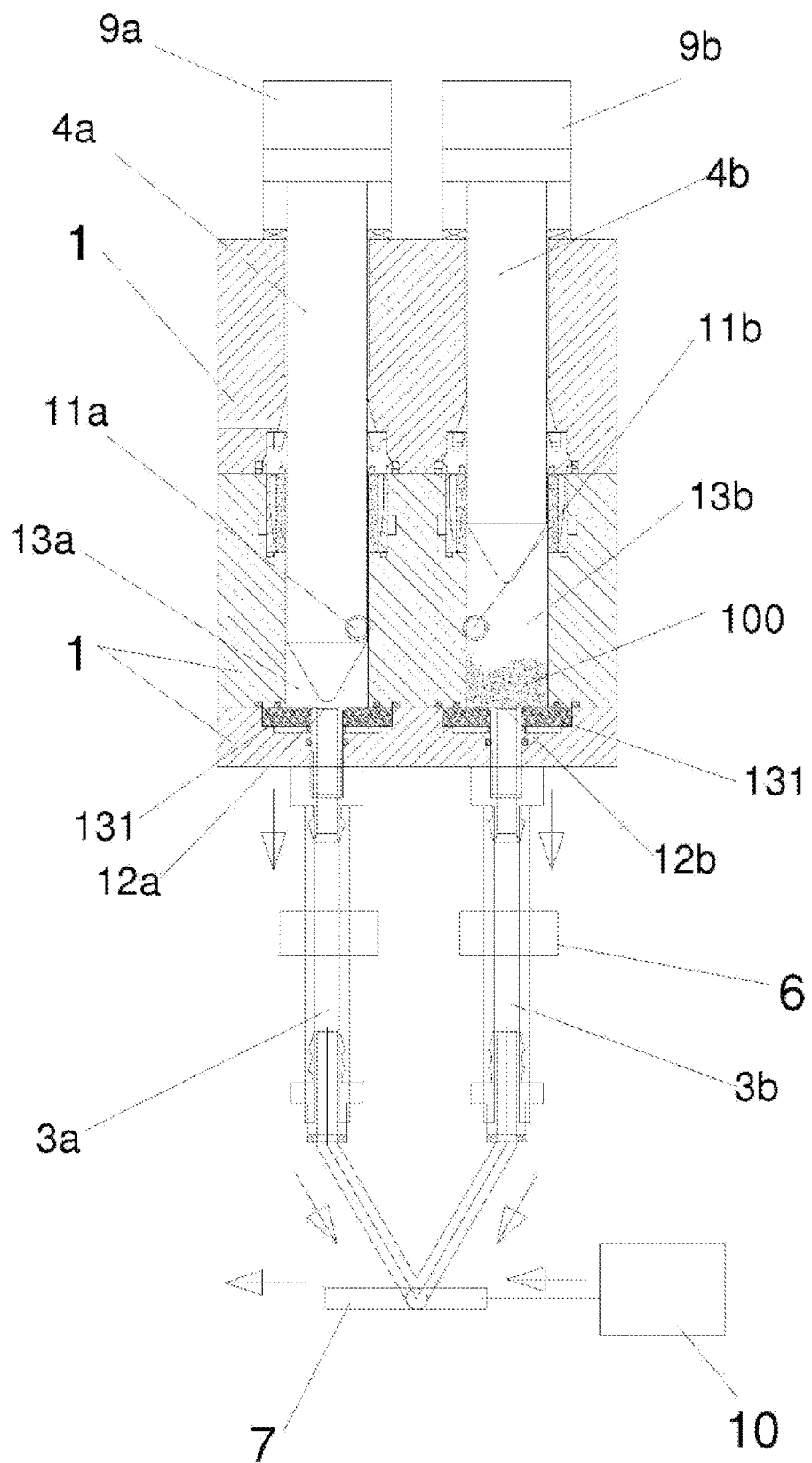
FIG. 4 is a schematic diagram of a powder conveying device according to a second embodiment of the present invention.
Figure 5:
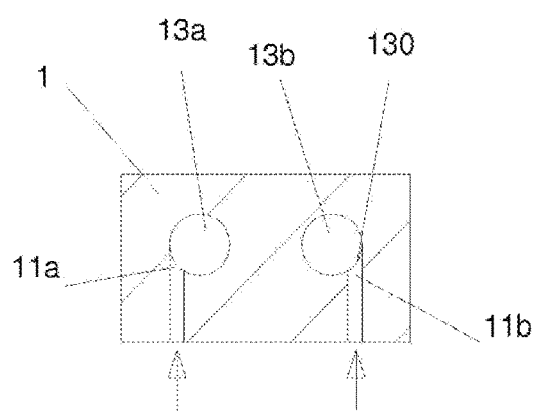
FIG. 5 is a first cross section view of the powder inlet of the device shown in FIG. 4.
Figure 6:
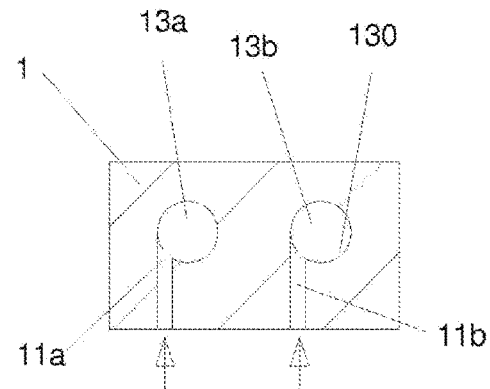
FIG. 6 is a second cross section view of the powder inlet of the device shown in FIG. 4.
Figure 7:
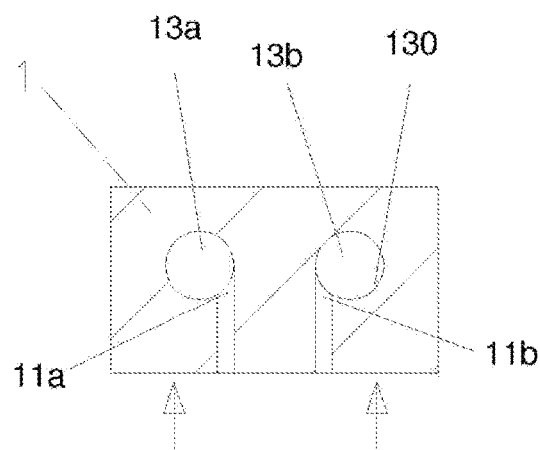
FIG. 7 is a third cross section view of the powder inlet of the device shown in FIG. 4.
Figure 8:
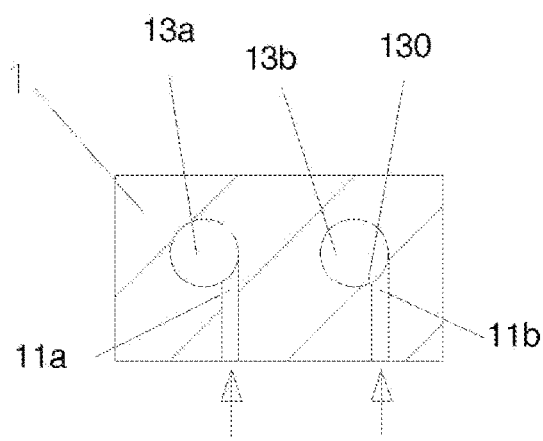
FIG. 8 is a fourth cross section view of the powder inlet of the device shown in FIG. 4

Referring to FIG. 4, in the conveying device according to a second embodiment of the present invention, the pump body 1 is configured to have a left transfer chamber 13a and a right transfer chamber 13b. A left powder sucking plunger 4a and a right powder sucking plunger 4b are respectively installed in the left transfer chamber 13a and the right transfer chamber 13b. The left transfer chamber 13a has a left powder inlet 11a that is connected to a left powder suction conduit (not shown), and a left powder outlet 12a that is connected to a left powder discharge conduit 3a. The right transfer chamber 13b has a right powder inlet 11b that is connected to a right powder suction conduit (not shown), and a right powder outlet 12b that is connected to a right powder discharge conduit 3b. The left powder suction conduit and the right powder suction conduit are controlled by a left powder suction valve and a right powder suction valve, respectively. The left powder discharge conduit 3a and the right powder discharge conduit 3b are controlled by one common powder discharge valve 6. The pump body 1 has a left drive cylinder 9a and a right drive cylinder 9b. The output end of the left drive cylinder 9a connects to a left powder sucking plunger 4a which is driven by the left drive cylinder 9a to move up and down. The output end of the right drive cylinder 9b connects to a right powder sucking plunger 4b which is driven by the right drive cylinder 9b to move up and down. The left powder outlet 12a and the right powder outlet 12b are configured in the bottom wall 131 of the transfer chamber 13.

By way of controlling the left drive cylinder 9a and the right drive cylinder 9b, the left powder suction valve and the right powder suction valve, and the powder discharge valve 6, the suction operation and discharging operation of the transfer chambers 13a and 13b is achieved. Preferably, when the left transfer chamber 13 is in a suctioning operation, the right transfer chamber 13b is in a discharging operation, and vice versa. By the synchronous and alternative operation, the powder is fed and pumped continuously and smoothly.

Both the left transfer chamber 13a and the right transfer chamber 13b are cylindrical chambers. The left powder discharge conduit 3a and the right powder discharge conduit 3b jointly connect to the mid-inlet of the powder gas mixer 7. The powder gas mixer 7 has one end connected to an auxiliary air device 10, and the other end for discharging powder.

Referring to FIG. 5 to FIG. 8, both the left powder inlet 11a, the right powder inlet 11b are configured in the inner sidewall 130 of the transfer chamber 13. The direction of left powder inlet 11a and the right inlet 11b is respectively tangential to the inner sidewall 130 of the transfer chamber 13.

Figure 9:
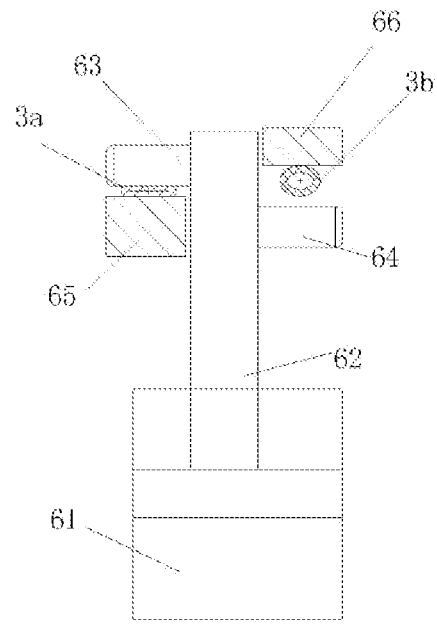
FIG. 9 schematically illustrates a first state of the left and the right powder discharge conduits of the second embodiment of the present invention.
Figure 10:
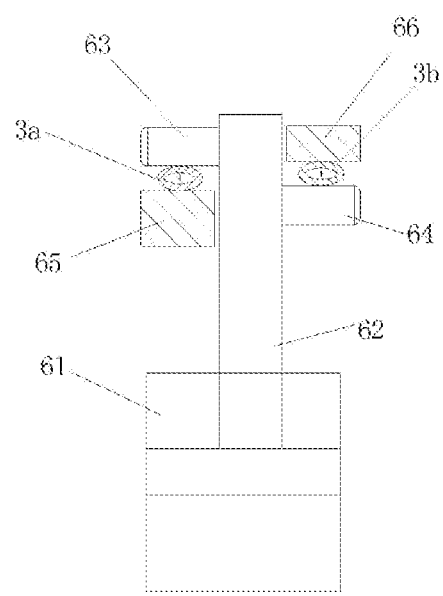
FIG. 10 schematically illustrates a second state of the left and the right powder discharge conduits of the second embodiment of the present invention.
Figure 11:
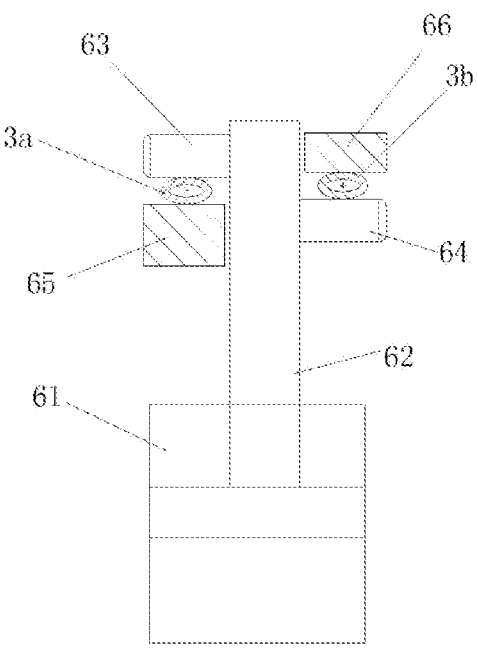
FIG. 11 schematically illustrates a third state of the left and the right powder discharge conduits of the second embodiment of the present invention.

Referring to FIG. 11, the left powder discharge conduit 3a and the right powder discharge conduit 3b are controlled by the powder discharge valve 6. The powder discharge valve 6 comprises a cylinder 61 and an output shaft 62. A left clamping assembly 63 and a right clamping assembly 64 couple with the output shaft 62. A left fixed member 65 is configured below the left clamping assembly 63. A right fixed member 66 is configured below the right clamping assembly 64. The left powder discharge conduit 3a is positioned between the left clamping assembly 63 and the left fixed member 65. The right powder discharge conduit 3b is positioned between the right clamping assembly 64 and the right fixed member 66. FIG. 11 illustrates a state wherein the left powder discharge conduit 3a and the right powder discharge conduit 3b are both opened and are being shifted immediately. When the output shaft 62 moves downward, the left clamping assembly 63 and the left fixed member 65 are moved to a clamping position and thus closing the left powder discharge conduit 3a, wherein the right clamping assembly 64 and the right fixed member 66 are moved to a separated position and thus opening the right powder discharge conduit 3b, as shown in FIG. 9. When the output shaft 62 moves upward, the left clamping assembly 63 and the left fixed member 65 are moved to a separated position and thus opening the left powder discharge conduit 3a, and the right clamping assembly 64 and the right fixed member 66 are moved to a clamping position and thus closing the right powder discharge conduit 3b, as shown in FIG. 10. Since the left powder discharge conduit 3a and the right powder discharge conduit 3b are jointly controlled by one powder discharge valve 6 which enables the alternative operations of both powder discharge conduits wherein a critical transition state is reached, as shown in FIG. 11. Since the discharging state of the two powder discharge conduits 3a and 3b are operating alternatively, the discharge of powder can therefore be able to overlap from the two transfer chambers ensuring a continuous and smooth powder delivery. The quantity and stability of the powder feeding is thus improved. In this second embodiment, the alternative discharge is achieved by using one executive component (such as a powder discharge valve 6), however, it is contemplated that it could be achieved by using more than one executive component that are controlled to operate according to predetermined sequences.

What is claimed is:

1. A powder conveying device, comprising:
a pump body (1), at least one powder sucking plunger (4), at least one powder suction conduit (2), at least one powder discharge conduit (3), at least one powder suction valve (5), a powder discharge valve (6), and a compressed air source; wherein
said pump body (1) comprising at least one transfer chamber (13), each of said at least one transfer chamber is configured with a powder inlet (11) connected to said at least one powder suction conduit (2), and a powder outlet (12) connected said at least one powder discharge conduit (3), each of said at least one transfer chamber (13) having an inner sidewall (130), an upper part and a bottom wall, wherein said bottom wall is a porous fluidized plate having a surface; and
said at least one powder sucking plunger (4) configured in the upper part of said at least one transfer chamber (13) and movable up and down inside the transfer chamber (13); when the at least one powder sucking plunger (4) moves upward, the at least one powder suction conduit (2) is opened by the at least one powder suction valve (5) and the at least one powder discharge conduit (3) is closed by the powder discharge valve (6) so that the powder is sucked into the at least one transfer chamber (13) through the at least one powder suction conduit (2); when the at least one powder sucking plunger (4) moves downward, the at least one powder suction conduit (2) is closed by the at least one powder suction valve (5) and the at least one powder discharge conduit (3) is opened by the powder discharge valve (6) so that the powder is discharged from the at least one transfer chamber (13) through the powder discharge conduit (3);
wherein the powder inlet (11) is configured in the inner sidewall (130) of the transfer chamber (13), and the powder inlet (11) is positioned above the powder outlet (12);
wherein the powder outlet is configured on the surface of the porous fluidized plate; and
wherein said compressed air source provides compressed air from the powder outlet to the porous fluidized plate to float and fluidize the powder in the at least one transfer chamber when the powder is discharged via the powder outlet.

2. The powder conveying device of claim 1, wherein each of said at least one transfer chamber (13) further having a bottom wall, and the at least one powder outlet (12) is configured in the bottom wall (131) of the at least one transfer chamber (13).

3. The powder conveying device of claim 2, wherein the at least one transfer chamber (13) is a cylindrical chamber.

4. The powder conveying device of claim 3, wherein the powder inlet (11) is tangential to the inner sidewall (130) of the transfer chamber (13).

5. The powder conveying device of claim 1, wherein a terminal end of the at least one powder discharge conduit (3) is connected to an inlet of a powder gas mixer (7); one end of the powder gas mixer (7) connects to an auxiliary air device (10), the other end of the powder gas mixer (7) connects to a powder conveying conduit and outputs gas-solid two phase flow.

6. The powder conveying device of claim 1, wherein:
the pump body (10) comprises a left transfer chamber (13a) and a right transfer chamber (13b), a left powder sucking plunger (4a) and a right powder sucking plunger (4b) that are respectively positioned inside the left transfer chamber (13a) and the right transfer chamber (13b);
the left transfer chamber (13a) is configured with a left powder inlet (11a) for connecting to a left powder suction conduit and a left powder outlet (12a) for connecting a left powder discharge conduit (3a);
the right transfer chamber (11b) is configured with a right powder inlet (11b) for connecting to a right powder suction conduit and a right powder outlet (12b) for connecting a right powder discharge conduit (3b);
the left powder suction conduit is controlled by a left powder suction valve, the right powder suction conduit is controlled by a right powder suction valve, the left powder discharge conduit (3a) and the right powder discharge conduit (3b) are simultaneously controlled by one common powder discharge valve (6).

7. The powder conveying device of claim 1, wherein:
each of the at least one powder suction conduit (2) comprises a first flexible conduit (22) and two connectors (21) that respectively connect to two ends of the first flexible conduit (22);
each of the at least one powder discharge conduit (3) comprises a second flexible conduit (32) and a second two connectors (31) that respectively connect to two end of the second flexible conduit (32).

8. The powder conveying device of claim 7, wherein the at least one powder suction valve (5) and the powder discharge valve (6) are pinch valves, each pinch valve comprising a drive cylinder (101) and a clamping assembly (102) driven by the drive cylinder (101) to clamp or unclamp the first flexible conduit (22) of each of the at least one powder suction conduit (2) and the second flexible conduit (32) of each of the at least one powder discharge conduit (3).

\* \* \* \* \*